United States Patent Office 3,463,809
Patented Aug. 26, 1969

3,463,809
PROCESS FOR PREPARING ALKYL SULFONATE
Richard E. Crocker, Anaheim, and Henry J. Kuenn, Lakewood, Calif., assignors to Atlantic Richfield Company, a corporation of Pennsylvania
No Drawing. Filed Sept. 27, 1965, Ser. No. 490,674
Int. Cl. C07c 139/00
U.S. Cl. 260—513     12 Claims

ABSTRACT OF THE DISCLOSURE

A process for producing alkyl sulfonates by contacting trialkyl aluminum with sulfur dioxide at temperatures of about −50° C. to about 75° C. is disclosed.

Alkyl sulfonates possess excellent biodegradability as well as desirable detersive, foaming and wetting properties. Consequently, alkyl sulfonates have been extensively used as detergents, for instance, in the formulation of detergent soaps. A variety of methods are known for the preparation of alkyl sulfonates but most have not proved entirely satisfactory for one reason or another. Thus, in view of the increasing demand for their detergents, alternative methods for their production in high yields are enthusiastically welcomed.

We have now discovered that alkyl sulfonates of Group III metals of the Periodic Table such as aluminum alkyl sulfonates can be prepared in good yields by reacting sulfur dioxide with a trialkyl Group III metal compound to provide as the major product the corresponding salt of a sulfonic acid. Hydrolysis of the metal salt yields the desired alkyl sulfonate. The trialkyl metal compounds can be represented by the following formula:

wherein $R_1$, $R_2$ and $R_3$ are similar or dissimilar alkyl groups often of up to 25 or more carbon atoms, preferably 8 to 18 carbon atoms, and M is a Group III metal, preferably aluminum or boron. The alkyl groups may be straight or branched chain but are preferably straight, i.e., normal alkyl groups. In the following, the invention will be described with reference to the aluminum sulfonate, although it should be understood that the invention is also applicable to other Group III metals.

The reaction is carried out by contacting the trialkyl aluminum with sulfur dioxide at convenient temperatures including ambient, reduced or elevated temperatures. Temperatures of about −50° C. to about 75° C. can be used but a range of −25° C. to +25° C. is preferred. Low temperatures are preferred because they tend to inhibit side reactions. Atmospheric pressures are preferred for the reaction although super- and subatmospheric pressures may be utilized if desired. It is also preferred to conduct the reaction under a blanketing atmosphere of inert gas such as nitrogen, hydrogen, or the like. The sulfur dioxide is preferably added in the gaseous state, although it can be added in liquid form, and in molar excess in order that the amount of alkyl aluminum sulfonate produced can be maximized. We have found that a sulfonate is produced even with minute quantities of sulfur dioxide being used and thus the amount of sulfur dioxide used is not a critical factor in the raction, although it of course controls the quantity of alkyl aluminum sulfonate which can be produced.

In an advantageous embodiment of the present invention, the sulfonation reaction is conducted in the presence of an inert solvent that is a liquid at the reaction temperature. The reaction product of the process of the invention usually contains a mixture of alkyl aluminum sulfonates and alkyl aluminum sulfinates which mixture generally predominates in the sulfonate. By use of a suitable solvent in the reaction, it has been found that the yield of the sulfonate can be even further increased, for instance, to yield in excess of about 90% by weight. Various essentially inert non-aromatic and aromatic solvents are contemplated for use as the solvent in the present invention, preferably those having a boiling point sufficiently below the sulfonate-sulfinate product mixture so that the solvent can be separated from the product by distillation. Solvents that may be employed include aliphatic, including cycloaliphatic, hydrocarbons, oxygenated solvents such as ethers, chlorinated hydrocarbons and nitriles. The preferred solvents, however, are usually liquid such as alkanes cyclic ethers and benzene aromatic solvents, particularly the latter. The amount of solvent employed can vary widely depending, for instance, on the alkyl metal and the particular solvent employed, but will usually fall in the range of about 50 to 500% of the alkyl metal and preferably about 100 to about 250% of the alkyl metal.

Suitable aliphatic hydrocarbon solvents include the straight and branched chain saturated hydrocarbons of about 5 to 12 carbon atoms. Illustrative of these hydrocarbon solvents are pentane, hexane, octane, nonane, decane, dodecane and cyclohexane.

Ether solvents that may be used include aliphatic and cyclic ethers of 2 to 12 carbon atoms including diethers and triethers. The ethers can be the simple ethers or mixed ethers. Illustrative of suitable ethers are methyl ether, ethyl methyl ether, ethyl ether, n-propyl ether, dioxane, anisole, phenetrole, diphenyl ether, benzyl phenyl ether, benzyl ether, naphthyl ether, and tetrahydrofuran.

The preferred solvents of the present invention are aromatic hydrocarbon solvents and include mono- and polycyclic aromatic hydrocarbons, usually of about 6 to 16 carbons such as benzene and its alkyl homologues, e.g., toluene and the xylenes, naphthalene, Tetralin and indane which may be substituted or unsubstituted.

The aluminum salt of sulfonic acid obtained by the sulfonation reaction of the invention may be converted to the desired alkane sulfonate by simple hydrolysis with a suitable hydrolyzing agent such as water or alcohol. Separation of the sulfonate from the resulting mixture of sulfonate, unconverted alkyl sulfinate and sulfonation by-products can be accomplished by known methods of the art including fractional distillation. It may be desirable under some conditions to remove the solvent before hydrolyzing the alkyl metatl sulfonate. Conventional stripping methods can be used to remove the solvent in these instances.

Trialkyl aluminum compounds sulfonated in accordance with the present invention can be prepared by known methods, for instance, from $AlCl_3$ and the Grignard reagent $RMgX$, which reaction can be illustrated as follows:

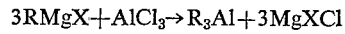
$$3RMgX + AlCl_3 \rightarrow R_3Al + 3MgXCl$$

As an alternative method, particularly for trialkyl aluminum compounds wherein the alkyl group is a chain of say at least 8 carbon atoms, is the Zeigler "growth reaction" of trialkyl aluminum and ethylene. In this method, a trialkyl aluminum compound whose alkyl groups are similar or dissimilar lower alkyl groups of say 2 to 4 carbon atoms are reacted with ethylene in a so-called "growth reaction" step to produce trialkyl aluminum compounds having chain lengths determined primarily by the amount of ethylene absorbed. For example, the growth reaction of trialkyl aluminum and ethylene takes place according to the following formula:

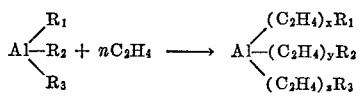

wherein $R_1$, $R_2$ and $R_3$ are similar or dissimilar lower alkyl groups and $x+y+z=n$. By a suitable choice of the quantity of ethylene used, it is possible to adjust the average molecular weight of the alkyl groups combined with the aluminum to obtain alkyl aluminums of the desired length. Further details on this "growth reaction" of ethylene and trialkyl aluminum can be found in the work of Zeigler and his associates disclosed in German Patent 878,560 and U.S. Patent 2,781,410. Still another method for obtaining the desired aluminum alkyl reactant is by exchanging a long chain olefin such as dodecene with a short chain aluminum alkyl as follows:

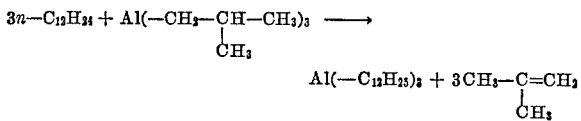

The following examples are included to further illustrate the present invention.

EXAMPLE I

The reaction of this invention was carried out in a glass microreactor with a stirring mechanism to permit introduction of the sulfur dioxide into the reaction mixture through the bottom of a hollow stirrer. The reactor head was equipped to permit blanketing the reaction mixture with an inert gas and recording reaction temperatures. A third outlet permitted free flow of exiting gases (excess $SO_2$ and the blanketing gas).

Twenty milliliters (17.1 g.) of tris-n-decyl aluminum (TND) was added to 30 ml. of dry hexane and the mixture cooled to 0° C. Sulfur dioxide was admitted to the agitated mixture at 70 to 100 ml./min. After 35 minutes, the mixture gelled. The solvent was stripped off and the product analyzed. Chemical analysis showed 15.5% aluminum decylsulfinates and 68.1% aluminum decylsulfonate were present.

EXAMPLE II

The apparatus used was the same as in Example I. Tris-n-decyl aluminum (16.6 g.) was diluted with 30 cc. of dioxane. Since dioxane solidifies at 11° C., this reaction was carried out at 23–25° C. Dry sulfur dioxide was added at 70 to 100 ml./min. and the mixture gelled in 33 minutes. The solvent was stripped off and the product analyzed. Results showed 24.1% sulfinate and 71.1% sulfonate.

EXAMPLE III

The process of Example I was duplicated except for the use of tert-butyl benzene instead of hexane as the solvent. Product analysis showed 1.0% sulfinate and 90.9% sulfonate.

EXAMPLE IV

Duplicate reactions to the above three examples were performed except that no solvent was employed and the reaction temperature was varied. The product at each temperature (−19, 0, 25° C.) showed a combined yield of sulfinate and sulfonate of about 70%. The lower temperatures appeared to favor sulfonate formation (52.1% at −19°, 46.9% at 0°, and 44.8% at 25°).

In order to demonstrate the operability of the invention with different proportions of sulfur dioxide, the following additional tests were conducted. The stoichiometry of the reaction requires three moles of $SO_2$ for every mole of trialkyl aluminum since a sulfonate group is formed for every alkyl group.

EXAMPLE V

Sulfur dioxide was introduced at the rate of 68.6 ml./min. into a microreactor containing 16.7 gm. (.031 mole) of tris-n-decyl aluminum dissolved in 20.4 gm. of heptane under the conditions described in Example I above. The reaction was continued for 10 minutes at which time 686 ml. of sulfur dioxide, which is equivalent to 0.03 mole of sulfur dioxide had been added thus giving an $SO_2$ to tris-n-decyl aluminum ratio of 1:1. The product was analyzed and found to contain 3.1 wt. percent sulfinate and 21.6 wt. percent sulfonate.

EXAMPLE VI

The procedure of Example V was repeated except that the sulfur dioxide was added for 20 minutes or until 0.06 mole of sulfur dioxide had been added to 16.7 gm. of tris-n-decyl aluminum dissolved in hexane giving an $SO_2$ to tris-n-decyl aluminum ratio of 2:1. The product was again recovered and analyzed. It contained 6.7 wt. percent sulfinate and 54.4 wt. percent sulfonate.

EXAMPLE VII

The procedure of Example V was again repeated except that the reaction was allowed to continue for 34 minutes at which time 2331 ml. or .104 mole of sulfur dioxide had been added to 16.7 gm. of tris-n-decyl aluminum dissolved in hexane to give an $SO_2$ to tris-n-decyl aluminum ratio of 3.4:1. The reaction product was recovered and analyzed with 4.3 wt. percent sulfinate and 50.6 wt. percent sulfonate being found.

It is claimed:

1. A process for preparing an alkyl sulfonate which comprises: adding sulfur dioxide to a Group III trialkyl metal dissolved in an organic solvent unreactive therewith to form an alkyl metal sulfonate, separating the solvent from said alkyl metal sulfonate, and hydrolyzing said alkyl metal sulfonate to produce an alkyl sulfonate.

2. The process of claim 1 wherein the metal is aluminum.

3. The process of claim 1 wherein the metal is boron.

4. A process for preparing an alkyl sulfonate which comprises adding sulfur dioxide to a Group III trialkyl metal to produce an alkyl metal sulfonate and hydrolyzing said trialkyl metal sulfonate.

5. The process of claim 4 wherein said Group III metal is aluminum.

6. The process of claim 4 wherein said Group III metal is boron.

7. The process of claim 4 wherein the reaction is carried out in the presence of an inert liquid solvent.

8. The process of claim 7 wherein the solvent is an aromatic hydrocarbon solvent having 6 to 16 carbon atoms.

9. The process of claim 7 wherein the solvent is an aliphatic hydrocarbon having from 5 to 12 carbon atoms.

10. The method of claim 7 wherein the solvent is selected from the group consisting of aliphatic and cyclic ethers of 2 to 12 carbon atoms.

11. The process of claim 4 wherein the reaction is carried out at a temperature of from about −50° C. to +75° C.

12. The process of claim 4 wherein the reaction is carried out at temperatures of from about −25° C. to +25° C.

References Cited

UNITED STATES PATENTS

| | | | |
|---|---|---|---|
| 3,121,737 | 2/1964 | Rutkowski et al. | 260—513 |
| 3,243,270 | 3/1966 | Flanagan | 260—448 XR |
| 3,311,650 | 3/1967 | Johnson | 260—513 XR |
| 3,341,561 | 9/1967 | Starks | 260—513 XR |

FOREIGN PATENTS 1,052,762   2/1959   Germany.

OTHER REFERENCES

Baker et al.: J. Amer. Chem. Soc. vol. 75, pp. 5193–95 (1953).

Zeiss: Organometallic Chemistry, Reinhold Publ. Corp., New York, p. 242 (1960).

TOBIAS E. LEVOW, Primary Examiner

H. M. S. SNEED, Assistant Examiner

U.S. Cl. X.R.

260—448, 545